(Model.)
J. G. MORTON.
Hand Corn Planter.
No. 241,504. Patented May 17, 1881.
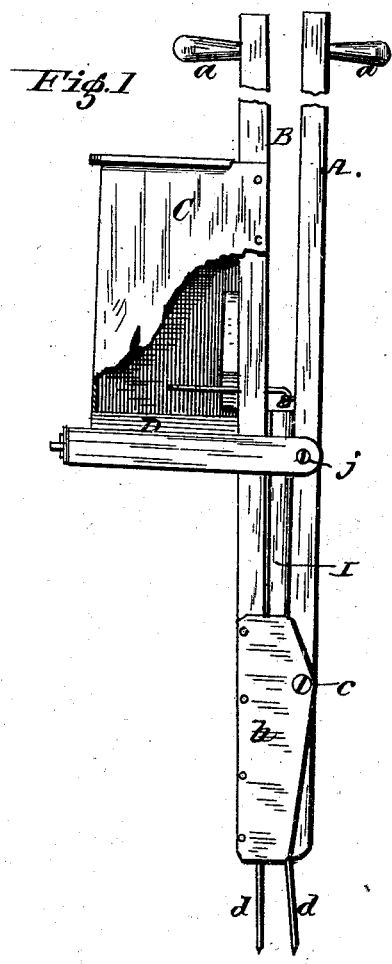
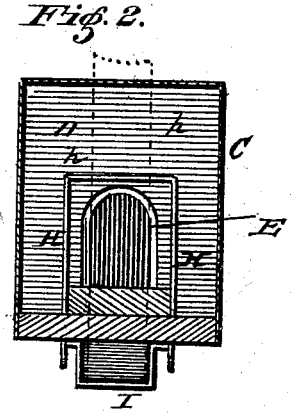
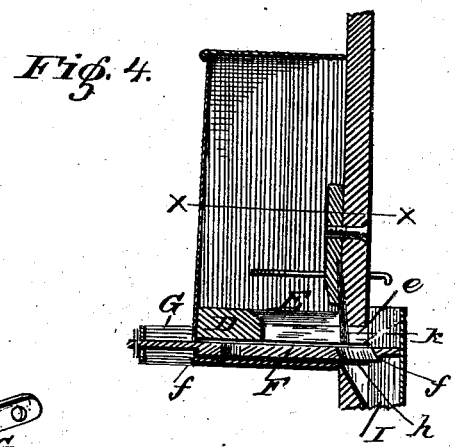
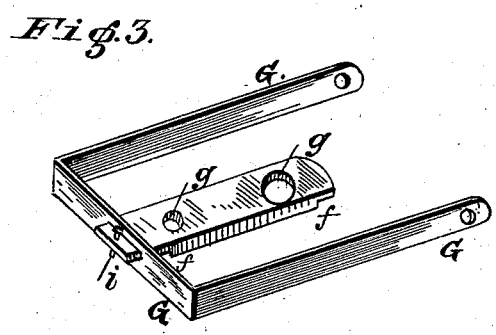
Witnesses.
Fred G. Dieterich
A. H. Krause
Inventor:
James G. Morton
by A. Peterson Jr.
Attorneys

UNITED STATES PATENT OFFICE.

JAMES G. MORTON, OF CANTON, MISSOURI.

HAND CORN-PLANTER.

SPECIFICATION forming part of Letters Patent No. 241,504, dated May 17, 1881.

Application filed October 21, 1880. (Model.)

*To all whom it may concern:*

Be it known that I, JAMES G. MORTON, of Canton, in the county of Lewis and State of Missouri, have invented certain new and useful Improvements in Hand Corn-Planters; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation, partly in section, to show the inside construction of the hopper with its reciprocating seed-slide. Fig. 2 is a cross-section through line $x\,x$, Fig. 4. Fig. 3 is a perspective view of the seed-slide with its clip; and Fig. 4 is a vertical cross-section of the hopper with its false bottom and seed-slide.

Similar letters of reference indicate corresponding parts in all the figures.

My invention has relation to hand-planters suitable for the planting of corn or smaller seed; and it consists in the construction and combination of parts, as hereinafter fully described, and particularly pointed out in the claim.

In the annexed drawings, A B are the side bars, which are provided with handles $a$, as usual. Bar B has side plates or wings, $b$, at its lower end, between which the opposite bar, A, is hinged at $c$, and both bars are provided at their lower ends with the cutting or ground blades $d\,d$, as usual.

The hopper C is affixed upon the outside of bar B, and has a false bottom, D, having an opening or slot, E, a little above the seed-opening $e$ in bar B. Between this false bottom and the bottom of the hopper is inserted the seed-slide F, which is made with a step or shoulder, $f\,f$, at each end, (see Fig. 3,) and two apertures or seed-cups $g\,g$, of different size, one for large and one for small seed. This slide is confined between parallel guide-bars $h\,h$, Fig. 4, in the bottom of the hopper, and its projecting outer end is inserted into a slot in the cross-bar of the clip or stirrup G and held therein by a pin or key, $i$. The ends of the clip G are pivoted by screws $j$ in opposite sides of bar A, and it follows that bars A B cannot be separated farther than to the end of the clip, which thus prevents said bars from coming too far apart in operating the planter.

A wire bail or bow, H, is hinged in bar A and projects into the hopper a short distance above the slotted false bottom D, for the purpose of stirring the seed contained in the hopper, so that the cup in the seed-slide will be filled or charged at each reciprocation. The aperture $e$ leading from the hopper to the chute or conductor I, on the inner side of bar B, is provided with a brush, $k$, which acts as a cut-off to prevent the seed from slipping back into the seed-cup on the withdrawal of the slide before it is deposited in the chute which conveys it to the lower end of the planter.

It will be observed that the seed-slide F may be reversed in its clip G, according to which of its cups $g$ it is desired to use, which will depend upon the size and character of the seed to be planted. In operating the planter the slide will only pass through the hopper far enough to allow the seed-cup to deliver the seed into the chute or conductor I on the withdrawal of the slide, so that no seed can pass this and be dropped into the planter outside of the seed-chute.

Having thus described my invention, I claim and desire to secure by Letters Patent of the United States—

In a hand corn-planter, the combination, with the bars A B, of the hopper C, constructed with the false bottom D, slotted at E, and parallel guides $h\,h$, pivoted clip or stirrup G, reversible seed-slide F, having cups $g\,g$, bail or stirrer H, and seed-chute I, arranged opposite to the seed-aperture $e$ in the hopper-bar, substantially as set forth.

In testimony that I claim the foregoing as my own I have hereto affixed my signature in presence of two witnesses.

JAMES G. MORTON.

Witnesses:
H. JOHNSON,
C. E. CUMMINGS.